(12) United States Patent
McKinnon

(10) Patent No.: US 12,167,784 B2
(45) Date of Patent: Dec. 17, 2024

(54) LUGGAGE CASE AND WHEEL SET THEREFOR

(71) Applicant: ROTACASTER WHEEL PTY LTD, Cranbourne (AU)

(72) Inventor: Peter McKinnon, Cranbourne (AU)

(73) Assignee: Peter Rodney McKinnon, Victoria (AU)

( * ) Notice: Subject to any disclaimer, the term of this patent is extended or adjusted under 35 U.S.C. 154(b) by 395 days.

(21) Appl. No.: 16/467,476

(22) PCT Filed: Dec. 11, 2017

(86) PCT No.: PCT/AU2017/000268
§ 371 (c)(1),
(2) Date: Jun. 6, 2019

(87) PCT Pub. No.: WO2018/102856
PCT Pub. Date: Jun. 14, 2018

(65) Prior Publication Data
US 2019/0320770 A1    Oct. 24, 2019

(30) Foreign Application Priority Data
Dec. 9, 2016    (AU) ................................ 2016905082

(51) Int. Cl.
*A45C 5/14*    (2006.01)
*B60B 19/00*    (2006.01)

(52) U.S. Cl.
CPC .............. *A45C 5/14* (2013.01); *B60B 19/003* (2013.01); *A45C 2005/148* (2013.01)

(58) Field of Classification Search
CPC ... B60B 19/003; A45C 5/14; A45C 2005/148; A45C 5/145; A45C 5/00
See application file for complete search history.

(56) References Cited

U.S. PATENT DOCUMENTS 2,132,316 A * 10/1938 Newton ................ B62B 5/0083
16/444
3,655,215 A *  4/1972 Becklin .................... A45C 5/14
280/79.2
(Continued)

FOREIGN PATENT DOCUMENTS

FR    3010283    3/2015
GB    2461770    1/2010
(Continued)

OTHER PUBLICATIONS

Fugu Luggage http://web.archive.org/web/20141130181154/http://boredbug.com/real-choice-travelers-never-fugu-luggage/ (Year: 2014).*
(Continued)

*Primary Examiner* — Don M Anderson
*Assistant Examiner* — Justin Caudill
(74) *Attorney, Agent, or Firm* — BYCER & MARION, PLC; Matthew L. Bycer

(57) ABSTRACT

A luggage case 20 has a main container 30 having a parallel piped shape and defining a rectangular block cavity 22. The container 30 includes a base 40i and a narrow rear wall 50. The base 40i includes a wheel base 42 comprising two sets of multi-directional wheels 44i and 44ii. Each wheel set 44i-44ii includes a rigid, beam or rod 46i, 46ii providing a substantially rigid and non-axially compressible structure at each end of the base 40i. The structures 46i, 46ii may form part of a wheel base 42 frame or may be simply formed in the interior of the generally stiffly constructed base 40i. The wheel sets 44i, 44ii include wheels 10,10i mounted to mounting points 26a, 26b, and are housed in recesses 24 at extreme ends of the first and second ends of the first and second edges 25i, 25ii. Handle arms 51 are housed in widely spaced channels 54 at the extreme sides of the rear wall 50.

19 Claims, 11 Drawing Sheets

(56) References Cited

U.S. PATENT DOCUMENTS

| | | | | |
|---|---|---|---|---|
| 3,861,703 | A * | 1/1975 | Gould | A45C 5/143 280/47.131 |
| 4,244,452 | A * | 1/1981 | Seynhaeve | A45C 5/14 190/18 A |
| 4,261,447 | A * | 4/1981 | Arias | A45C 5/14 16/113.1 |
| 4,813,520 | A * | 3/1989 | Lin | A45C 5/14 220/9.3 |
| 5,181,590 | A * | 1/1993 | Carpenter | A45C 13/262 190/115 |
| 5,197,578 | A * | 3/1993 | Van Hooreweder | A45C 5/14 190/115 |
| 5,368,143 | A * | 11/1994 | Pond | A45C 5/14 280/37 |
| 5,762,168 | A * | 6/1998 | Miyoshi | A45C 5/14 190/115 |
| 5,833,039 | A * | 11/1998 | Kotkins, Jr. | A45C 13/262 190/115 |
| D425,705 | S * | 5/2000 | Santy | D3/321 |
| 6,073,737 | A * | 6/2000 | Kang | A45C 5/14 190/113 |
| 6,176,357 | B1 * | 1/2001 | Kuo | A45C 13/262 190/115 |
| 6,857,707 | B2 * | 2/2005 | Guile | B60B 33/0028 301/5.23 |
| 7,896,143 | B2 * | 3/2011 | Lee | A45C 5/02 190/100 |
| 8,556,279 | B2 * | 10/2013 | McKinnon | B60B 33/0039 414/490 |
| 8,783,432 | B2 * | 7/2014 | Wang | A45C 5/03 190/18 R |
| 9,060,577 | B2 * | 6/2015 | Farrelly | A45C 13/103 |
| 2006/0207848 | A1 * | 9/2006 | Sher | A45C 5/14 190/18 A |
| 2007/0145700 | A1 | 6/2007 | Ambrose et al. | |
| 2008/0236972 | A1 * | 10/2008 | Lee | A45C 13/262 190/18 A |
| 2009/0242344 | A1 * | 10/2009 | Selvi | A45C 5/14 190/115 |
| 2011/0031082 | A1 * | 2/2011 | Chi | A45C 5/145 190/18 A |
| 2012/0019048 | A1 * | 1/2012 | Mckinnon | B60B 19/003 29/894 |
| 2013/0075213 | A1 * | 3/2013 | Chi Yueh Chen | E05D 11/1064 190/107 |
| 2015/0108739 | A1 * | 4/2015 | Kassab Arabo | A45C 7/0063 280/651 |
| 2015/0245694 | A1 * | 9/2015 | Banoun | A45C 5/14 190/18 A |
| 2017/0340076 | A1 * | 11/2017 | Liang | A45C 13/103 |
| 2019/0008254 | A1 * | 1/2019 | Newson | A45C 5/14 |

FOREIGN PATENT DOCUMENTS

| | | |
|---|---|---|
| GB | 2519297 | 4/2015 |
| WO | WO2016109867 A1 | 7/2016 |

OTHER PUBLICATIONS

Fugu Luggage https://www.youtube.com/watch?v=zk9EeqRHhrY (Year: 2014).*

* cited by examiner

LUGGAGE CASE AND WHEEL SET THEREFOR

FIELD OF INVENTION

This invention relates to a portable and mobile luggage case. More particularly, this invention relates to a luggage wheel base for a portable and mobile luggage case.

BACKGROUND ART

The following references to and descriptions of prior proposals or products in relation to luggage design are not intended to be, and are not to be construed as, statements or admissions of common general knowledge in the art of luggage design. In particular, the following prior art discussion should not be assumed to relate to what is commonly or well known by the person skilled in the art in luggage design, but to assist in understanding the inventive process undertaken by the inventor(s) and in the understanding of the invention itself.

Luggage cases have been described that have wheels to enable a user to drag a luggage case by a handle, the latter being typically extended. A luggage wheel base may comprise a pair of spaced wheels or one of or two pairs of caster wheels. Caster wheels may be useful to permit the luggage wheel base to self-support the case, e.g. by providing a planar base of 3 or more wheels. Where there are two sets of wheels, one set may be of a fixed axis, whilst the other pair may be caster wheels to enable rotation of the wheel base about a vertical axis when in the self-supporting position. In the self-supporting position, a wheel base may be substantially horizontal with all wheels in ground contact.

Wheel bases with four caster wheels have been described and these provide agility and manoeuvrability, particularly in an office, hotel, or most particularly, an airport environment. However, caster wheel luggage devices are bulky due to the large wheel hub required to house the casters' swept path. They also have poor tracking ability, have inherent ergonomic disadvantages due to their shifting horizontal axes and do not perform well in negotiating obstacles. Furthermore, caster wheels are reactive to minor forces and can quickly roll away on the slightest of inclines. They are exposed to substantial potential impact forces during both use and transportation, as well as cantilevered forces when tilted onto two wheels, potentially resulting in damage.

But fixed wheel luggage devices generally suffer from lack of lateral manoeuverability, so that the trade off to achieve better stowage and trackability still results in an unsatisfactory result.

An object of the present invention is substantially to provide the advantages of both the fixed and caster wheel devices, whilst ameliorating one or more of the disadvantages of each.

STATEMENT OF INVENTION

The invention according to one or more aspects is as defined in the independent claims. Some optional and/or preferred features of the invention are defined in the dependent claims.

Accordingly, in one aspect of the invention there is provided:

A luggage case wheelbase, the luggage case including:
a container defining a storage space, the container having
a base with at least a first edge having a first mounting point at a first end of the first edge and second mounting point at a second end of the first edge,
wherein the luggage case further includes:
a wheel set including at least a first multi-directional wheel located at or near the first end of the first edge and a second multi-directional wheel located at or near the second end of the first edge to maximise the storage space 22;
the first and second omni-wheels 10 are housed in widely spaced recesses 24 at the extreme ends of the first edge 441;
the first and second wheels each having a fixed main axis; and
the fixed main axes of each of the first and second wheels being substantially parallel to a straight line extending between the first and second ends.

In another aspect, the invention provides:
Use of a Luggage Case Having:
a handle mounted to an upper portion of the case;
a container defining a storage space, the container having a base with at least a first edge having a first mounting point at a first end of the first edge and a second mounting point at a second end of the first edge, wherein the luggage case further includes:
a wheel set including at least a first multi-directional wheel located at or near a first end of the first edge and a second multi-directional wheel located at or near a second end of the first edge to maximise the storage space;
the first and second omni-wheels are housed in widely spaced recesses 24 at the extreme ends of the first edge;
the first and second wheels each having a fixed main axis;
the fixed main axes of each of the first and second wheels being substantially parallel to a straight line extending between the first and second ends; and
wherein the use includes and hauling the case across a ground or floor surface by the handle.

The handle is preferably collapsible, for example by telescopically retracting the handle into a receiving housing, such as a set of channels or tubes in a spine of the case.

In still another aspect, the invention provides: A method of manufacturing a luggage case, comprising the steps of:
forming a container that defines a storage space and a base with a first edge;
mounting a pair of multidirectional wheels on the first edge with a first multidirectional wheel at a first end of the first edge and a second multidirectional wheel at a second end of the first edge, each multidirectional wheel having a fixed main axis, whereby the main axes are substantially parallel to an imaginary line extending between the first and second ends.

The base is preferably substantially rectangular in shape. The first edge preferably forms a short side of the base. The first edge may be shorter in length than a second side substantially normal to the first side. The first side may be between 40-70% of the length of the second side, preferably 45-55% or 60-70%, and still more preferably between about half and about two-thirds the length of the second side.

The luggage case may be a travel bag or suitcase, including a carry-on bag as defined from time to time by commercial airlines. Carry-on bags currently typically have total linear dimensions of about 1000-1150 mm, for example width equals 340-360 mm, length equals 480-560 mm and depth equals 200 mm-250 mm, preferably 230 mm, including the wheel base.

The container is typically a square or rectangular block shape (parallelepiped), having three different dimensions of width, length and depth. However, other case shapes are contemplated as being within the scope of the invention.

The storage base may therefore generally be a closable cavity defined by a back wall, two side walls, the base, a drop wall and a lid. The lid may be closable using standard means, such as a zip mechanism. The back wall or a side wall may comprise one or more longitudinal ridges to house a telescopic handle. Preferably, the handle includes a pair of spaced, parallel telescopically extendable rods of substantially equal length and terminating in a handle. The handle may be adapted to bridge an outward end of the rods. Optionally, the handle, when retracted, is housed in or along a back wall or side wall sharing the second (preferably long) edge with the base. Preferably, the handle is located in or on a short width wall, so that the case can be manipulated more easily by the handle whilst the case presents a narrow profile in the predominant direction of travel.

The base may be comprised of the first edge, and may include a rigid bar or other elongate element extending between the first and second mounting points and providing a substrate for the first end. To form the base, the first edge may provide one edge of a substantially square or rectangular base of substantially planar and rigid construction with a main axis about which the multidirectional wheel is adapted to rotate, wherein the main axes of the first and second multidirectional wheels are parallel to a straight line extending between the opposed ends of the first edge.

The first edge may be concave, curved, indented or otherwise comprise a non-straight edge. To maximise space in the storage space, preferably the first edge is straight. The base may be concave and may have one or more curved edges and may therefore have a semi-circular shape. However, preferably the base is rectangular.

Preferably, the first edge is formed along the short edge of the base and the mounting points and first end and second ends are located at the corners of the first edge and a side wall. For example, the side wall may correspond to the side of the case on which the lid is hinged along one of the side walls long edges which may house the handle in a retracted position. A portion of the first and second wheels may extend proud beyond the first edge. However, preferably the main axes of the first and second wheels are within the perimeter of the luggage case. In this connection, preferably the main axes of the first and second wheels are within the boundaries of the luggage case when consider in side projection.

The mounting points may include one or more bores formed in a rigid frame of the base. The frame is advantageously structurally supported to ensure that the first and second wheels are fixed, and spaced from each other and from the ground surface. The mounting points may be in the form of recesses formed in or on an exterior surface or structure of the container. The recesses may be sufficiently deep within the external boundaries defining the volume of space practically occupied by the container to partially house each wheel. The recesses may be sized to expose each wheel proud of the container exterior. This may ensure that the ground contacting portion of each wheel adequately spaces the container from the ground surface.

Because the multi-directional wheels have a fixed main axis, the recess volume is much smaller compared to that of a comparative or equivalent prior art caster wheel. For a caster wheel to effectively operate, it would require a clear sweep volume (or are area in plan) in which to swivel under the base or frame of the case and preferably within the footprint of the case. The multi-directional wheels have only rotation of a main frame about the main axis and peripheral roller moving parts that are retained within a generally constant footprint of the wheel in the same manner as a fixed standard wheel. Therefore, the multidirectional wheel occupies a substantially constant volume, irrespective of the extent to which the main frame rotates or the peripheral rollers permit lateral travel relative to a swivel caster. The multidirectional wheel may therefore be housed predominantly within the footprint of a case according to the invention. As such, the multidirectional wheels are well protected from blunt force impacts, thereby extending their potential lifespan.

The multiple directional wheel provides a relatively narrow end profile, so that the recessed space at the mounting point is small and need only accommodate a wheel rotating consistently in the same general plane, rather than a wheel swivelling through an are requiring a spherical portion of space. Furthermore, the recess provides protection for the multidirectional wheel with the fixed and stable main axle against scuffs and buffeting. This is unlike prior art caster wheels that can swivel outside the profile or footprint of the case.

The fixed main axle of the multidirectional wheel enables it to occupy a substantially constant volume of space within the recess.

The multi-directional wheels may be supplied by Rotacaster Wheel Pty Ltd (www.rotacaster.com.au) and may be substantially as described in the present applicant's published Patent No. EP2490903, the entire contents of which are incorporated herein by reference.

The fixed main axis of the first and second wheels is substantially parallel to a straight or imaginary line extending between the first and second ends of the first edge. Preferably, the main axes of the first and second wheels are coaxial.

In addition to the first and second multidirectional wheels, the wheel base may comprise one or two additional wheels which are preferably multiple directional wheels. The additional wheels may be of a smaller diameter (the radial line between the main axis and the ground contacting surface being smaller), or may be the same size as the first and second wheels. The additional wheels may comprise a pair of spaced wheels located at each end of an opposed base edge aligned parallel, spaced and opposed to the first edge. The opposed base edge may extend along the short edge of the base opposed to the first edge.

In use, the luggage case handle may be extended from the side wall and used to tilt the luggage case in the direction of the handle relative to a centre point of the top wall, so that the user supports the suitcase in the tilted position, balancing on the first and second wheels. In another mode of transport, where the wheel base comprises a set of three or four wheels, the luggage case may be self-supporting on the wheel base and may be pushed along with the base lying in a plane substantially parallel to that of the ground surface.

Curbs or raised obstructions may be mounted by tilting the luggage case in the direction of the handle as previously described and allowing the additional third and/or fourth wheels to be elevated above or onto the upper surface of the curb. The luggage case may then be rotated about the additional wheels to bring the remainder of the wheel base up on to the curb in a substantially flat position. A set of stairs may be mounted by tilting the luggage case toward the handle and the stairs. The case may then be hauled over the lip of each step with the first and second wheels riding over each lip.

By providing multiple directional wheels having a fixed main axis on the short first edge, the luggage case may be negotiated through narrow spaces. Because the main axes are stationary and the first and second wheels are set as wide as possible relative to the luggage case footprint when the base is viewed as a top plan view, the luggage case is very stable and not prone to undesirable lateral rocking, unlike the caster wheel equivalent in respect of which over-turning is a risk.

Overturning, or indeed any lateral instability of the cases of the prior art whilst being pushed or pulled, can lead to wrist, shoulder and/or back injuries, such as strains. Due to its dependable directional tracking, the case of the present invention can be pushed with confidence and control, even when the case is oriented to travel in the direction of its predominant longitudinal axis. In this situation, the case is oriented so that the first edge is aligned substantially normal to the direction of travel.

The luggage case may be braked. The braking may include a brake mechanism. The brake mechanism may include a braking member, such as a pivotal cam or friction pad. The braking member may be located adjacent at least one wheel in a corresponding wheel recess. The brake mechanism may be actuated by the collapsing of a telescopic handle. The telescopic handle may include a lower-most telescoped section forming part of the handle. The lower-most telescoped section preferably urges the brake mechanism into engagement with the wheel. The braking mechanism preferably is spring biased to urge the braking member out of engagement with the wheel. The braking member may therefore be urged against a spring bias operating adjacent the pivot of the brake by the operation of the lower-most telescoped section. The spring bias may comprise an axial spring intermediate the length of the lower section.

The retraction of the handle may correspond to the lowering of the lower section towards the brake mechanism. The expansion of the handle may correspond to the lifting of the lower section away from the brake mechanism. By this means, the brake mechanism is applied or released. The wheel is therefore preferably unbraked when the handle is expanded.

Preferably, the brake member is applied to the wheel when the handle is retracted into a corresponding recess in the body of the luggage case. The brake member may be aligned co-parallel with the lower section and comprise a stop on the end of the lower section. The brake member may by aligned substantially axially relative of the lower section.

The luggage case may be manufactured from standard materials. The wheel base may include a steel or strong polymer material. The polymer material may be resin-based polymers, such as nylon, acetal or reinforced polypropylene.

Prior art approaches to luggage wheel bases provide useful functionality, but they suffer from either lack of stability and tracking ability, or from lack of manoeuvrability. It is able to provide the independent advantages of prior art of swivel casters and fixed wheels, while providing additional advantages and improvement over both swivel casters and fixed wheels. Luggage cases made according to the invention provide advantages over the prior art, including improvements with regard to:
- space for packing in the luggage container (the diminished space of a prior art carry on bag due to use of casters may be regained with the use of multi-directional wheels). This is similar to two fixed wheel luggage and for the invention is in addition to the efficiency that results from a relocated handle;
- embarking at terminals, hotels and waypoints;
- directional control;
- encouraging the preferred ergonomic orientation in which the luggage case is pushed by the operator. It also facilitates the luggage being pulled, if preferred;
- queue and aisle negotiation;
- curb and step negotiation;
- transit to gates at airports and other transport hubs; and/or outside streetscape transit to hotels etc.

BRIEF DESCRIPTION OF THE DRAWINGS

The invention may be better understood from the following non-limiting description of preferred embodiments, in which:

FIG. 2b is a side view of the case shown in FIG. 2a;

FIG. 4 is a side view of the case shown in FIG. 2a in a tilted position T; Figure Sa is a perspective view of a second embodiment of the invention; Figure Sb is another perspective view of the second embodiment shown in FIG. 5a;

FIG. 5c is an end view of the case shown in FIG. 2a in an alternative tilted position T compared to the position shown in FIG. 4a;

FIG. 7b is a rear view of the case partially cut away to reveal one of the brake and wheel mechanisms shown in FIG. 7a.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

Figure 1A:
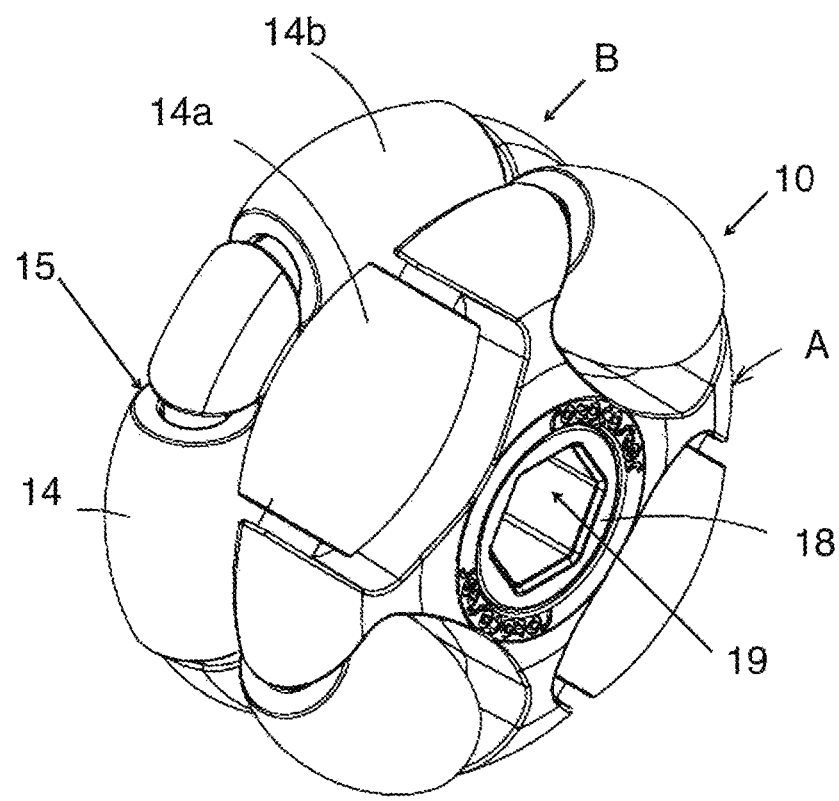
FIGS. 1a and 1b are perspective views of multi-directional wheels as incorporated in the preferred embodiments of the invention.
Figure 1B:
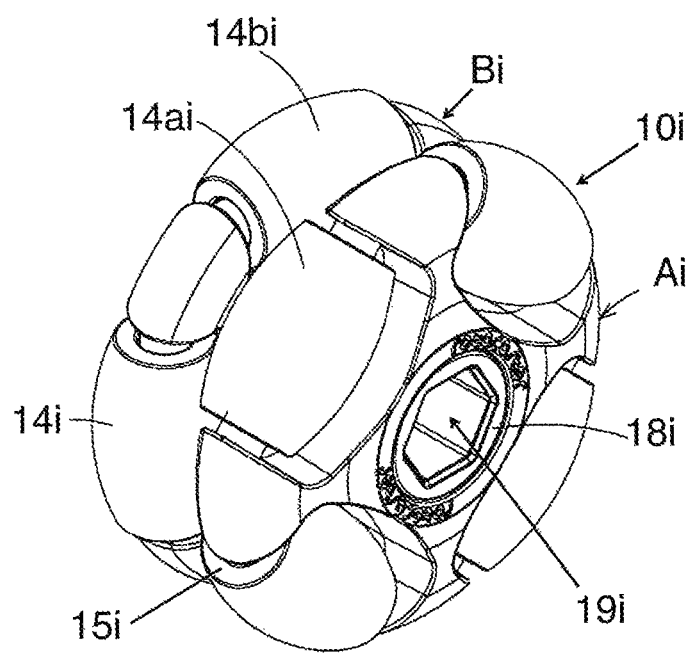

Referring to FIGS. 1a-1b, there is shown a large multi-directional wheel 10 and an optionally smaller multi-directional wheel 10i. In each case, the wheels 10, 10i comprise a hub and multiple rollers 14, 14i and, in particular, two roller races having rollers 14a, 14b in the case of wheel 10, and rollers 14ai, 14bi in the case of wheel 10i. The rollers 14, 14i of each race A, B, Ai, Bi are offset relative to one another and overlap at their respective ends 15, 15i compared to diagonally adjacent rollers 14, 14i from the other race A, B, Ai, Bi so that, in use, at least one roller 14, 14i can be in effective ground engaging contact.

The hub of each wheel 10, 10i respectively includes a centre region 18, 18i having an axial bore 19, 19i for effective mounting of the wheel 10, 10i on a main axle having a corresponding axis 62, 62i. The main axle is, in turn, mounted to a luggage case 20 as will be described with reference to FIGS. 2a-4b.

Referring particularly to FIG. 1b, the smaller multi-directional wheel 10i is shown. Functionally and with regard to internal relative proportions, the wheel 10i is similar to the wheel 10 and may be identical in its dimensions. However, in this favoured embodiment, the wheel 10i is proportionally smaller relative to the wheel 10. The smaller wheel 10i may have a main wheel diameter of 40-60 mm, most preferably about 50 mm. The larger wheel 10 may have a main wheel diameter of at least about 50 mm, and preferably at least about 70 mm, and most preferably about 80 mm, but may be larger. The wheels 10, 10i are available from the Applicant.

Another embodiment involves all four multidirectional wheels 10,10i being of the same size, and in any case being larger in diameter than current swivel castors employed on small luggage bags and provide an improved ride on rough surfaces and carpet, relative to equivalent luggage cases bearing caster wheels. Ideally, the diameter dimensions of multiple directional wheels 10,10i are similar to those traditionally used as fixed standard wheels on cases i.e 70-80 mm, but can vary in a range down to 60 mm in diameter. This ensures optimum capability over a variety of different terrains in both four and two wheel movement modes. Smaller wheels 10i could be used on the front of a case 20, especially for "carry-on" luggage, but the bigger the wheel 10 the better for the purposes of negotiating more difficult terrain or obstacles.

The invention may be demonstrated in relation to a preferred embodiment comprising a luggage case 20. The luggage case 20 includes:
  a container 30 defining a storage space 22 and having a base 40 with at least a first edge 25i having a first mounting point 26a at a first end of the first edge 25i and second mounting point 26b at a second end of the first edge 25i,
  wherein the luggage case 20 further includes:
  a wheel set 44i including at least a first multi-directional wheel 10 located at or near the first end of the first edge 25i and a second multi-directional 10 wheel located at or near the second end of the first edge 25i,
  the first and second wheels 10 each having a fixed main axis 62,
  the fixed main axes 62 of each of the first and second wheels 10 being substantially parallel to a straight line 27i extending between the first and second ends.

Figure 2A:
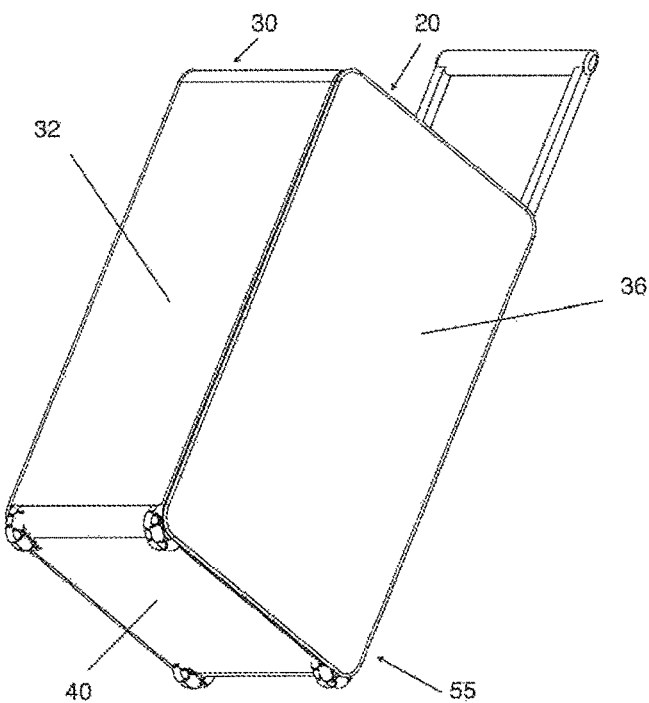
FIG. 2a is a perspective view of a luggage case according to a first embodiment of the invention.

Referring to FIG. 2a, the luggage case 20 made according to a preferred embodiment of the invention is shown in a tilted position. The case 20 comprises a main container 30 having a parallelepiped shape and defining a rectangular block cavity 22. The container 30 includes six panel walls, including a base 40, a narrow rear wall 50, a narrow front wall 32, a wide side panel 34, and a closable upper lid panel 36, closed by a standard zip fastener (as is standard in the field) to the adjacent walls of the container 30, including an upper end wall 38. The lid 36 may form one half of a clam shell arrangement with another part of the clam shell forming a base which, together with the similarly shaped lid 36, can be closed along a mid-line half way along the walls of the container to define the inner cavity 22 of the container 30. The lid 36 may alternatively form one half of a clam shell arrangement with another part of the clam shell forming a base 32,34,38,40 with walls whereby the lid 36, can be closed along a top edge of the wall 32,38,40 of the container in this orientation to define the inner cavity 22 of the container 30.

Figure 3:
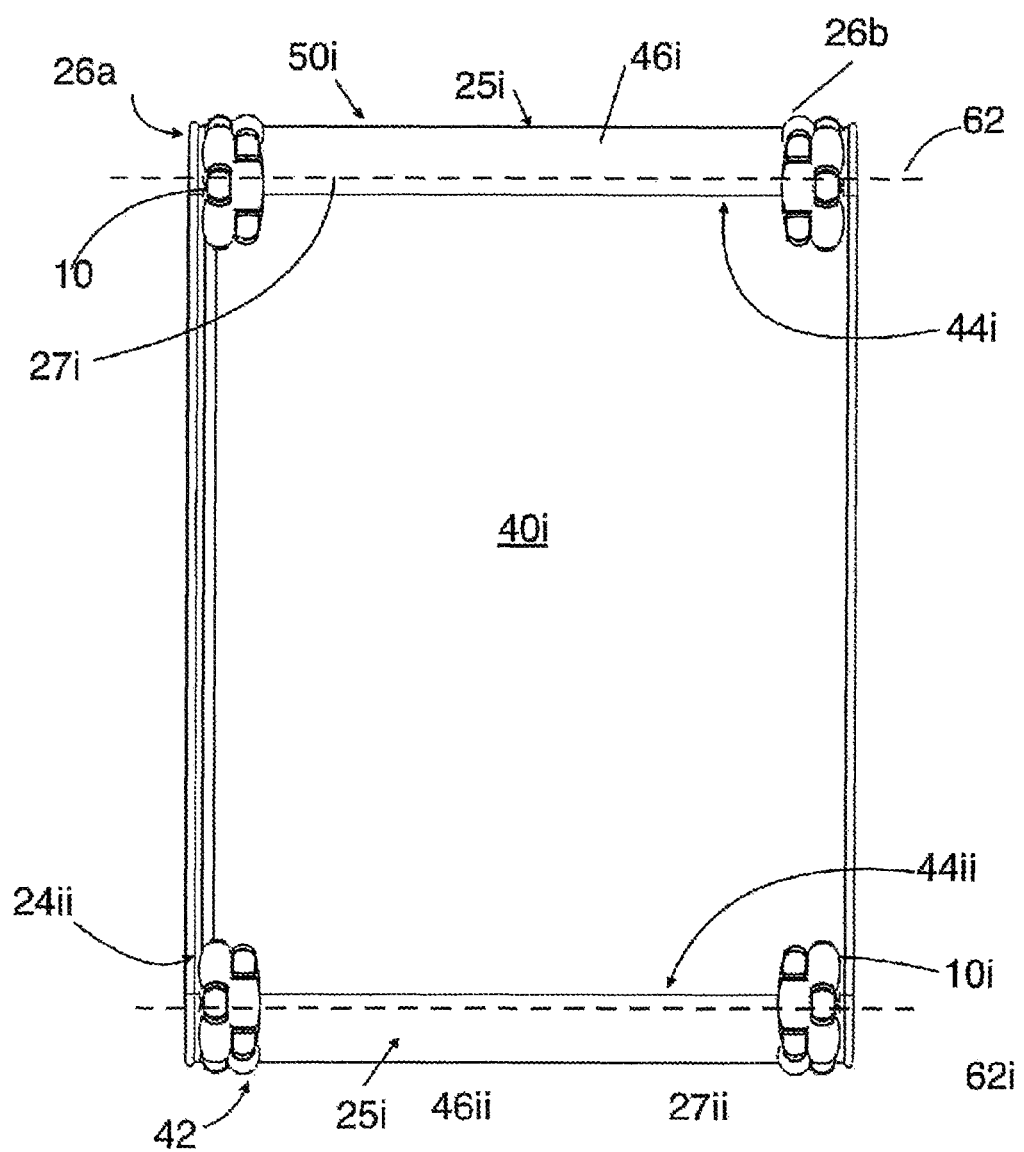
FIG. 3 is a lower plan view of a case according to another embodiment.
Figure 4:
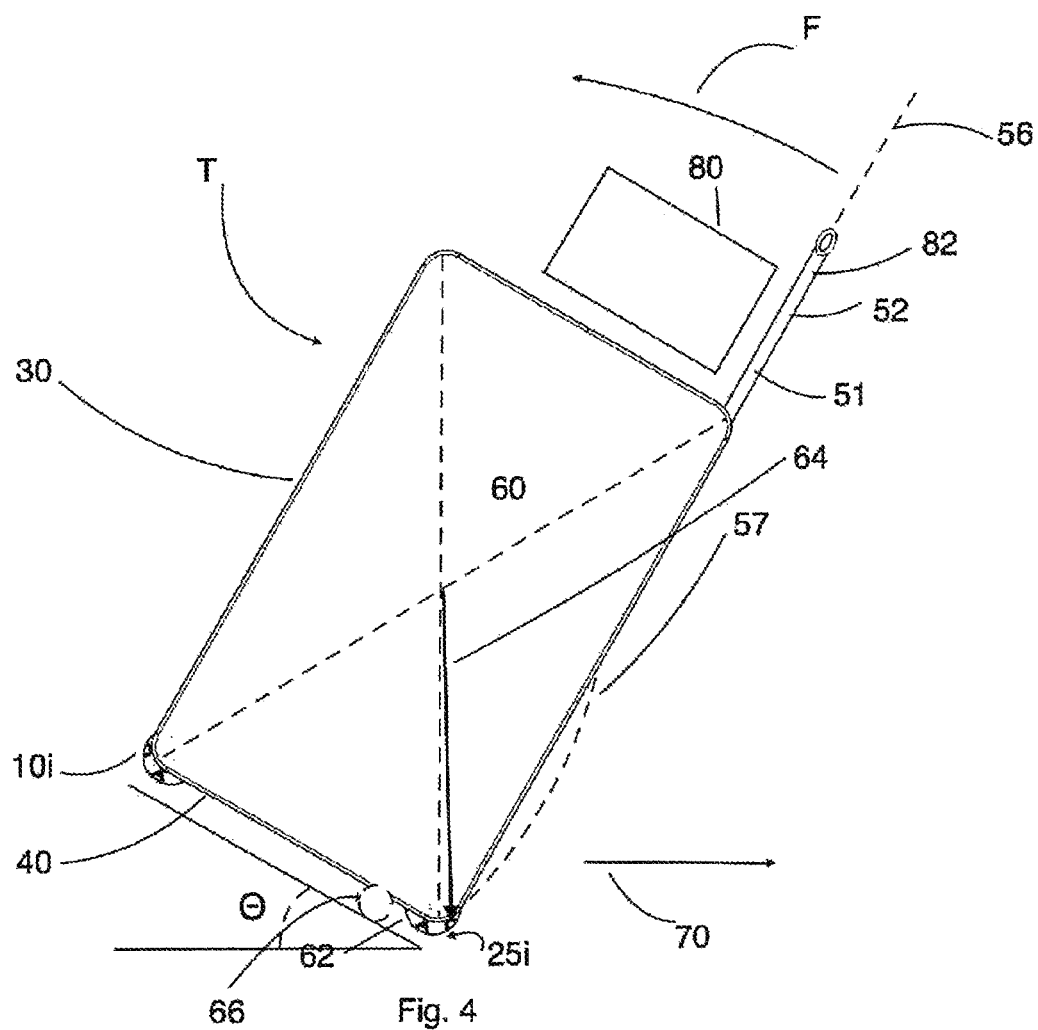
Figure 5A:
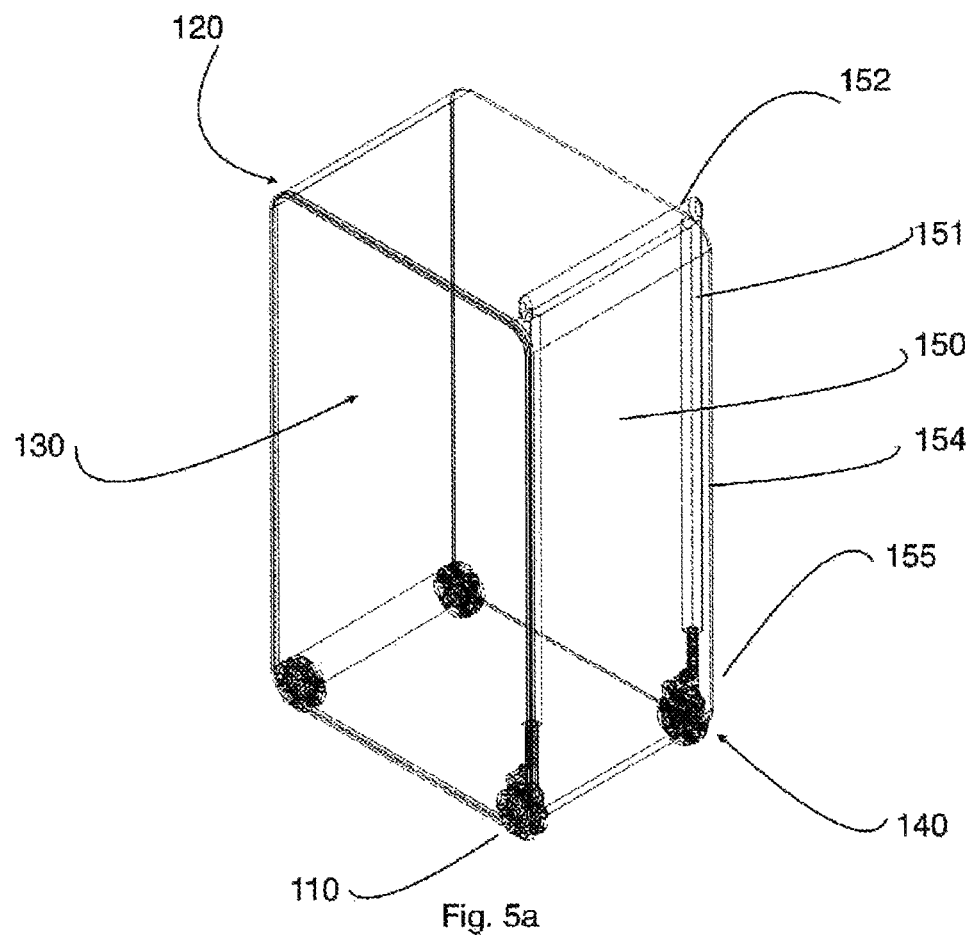
Figure 5B:
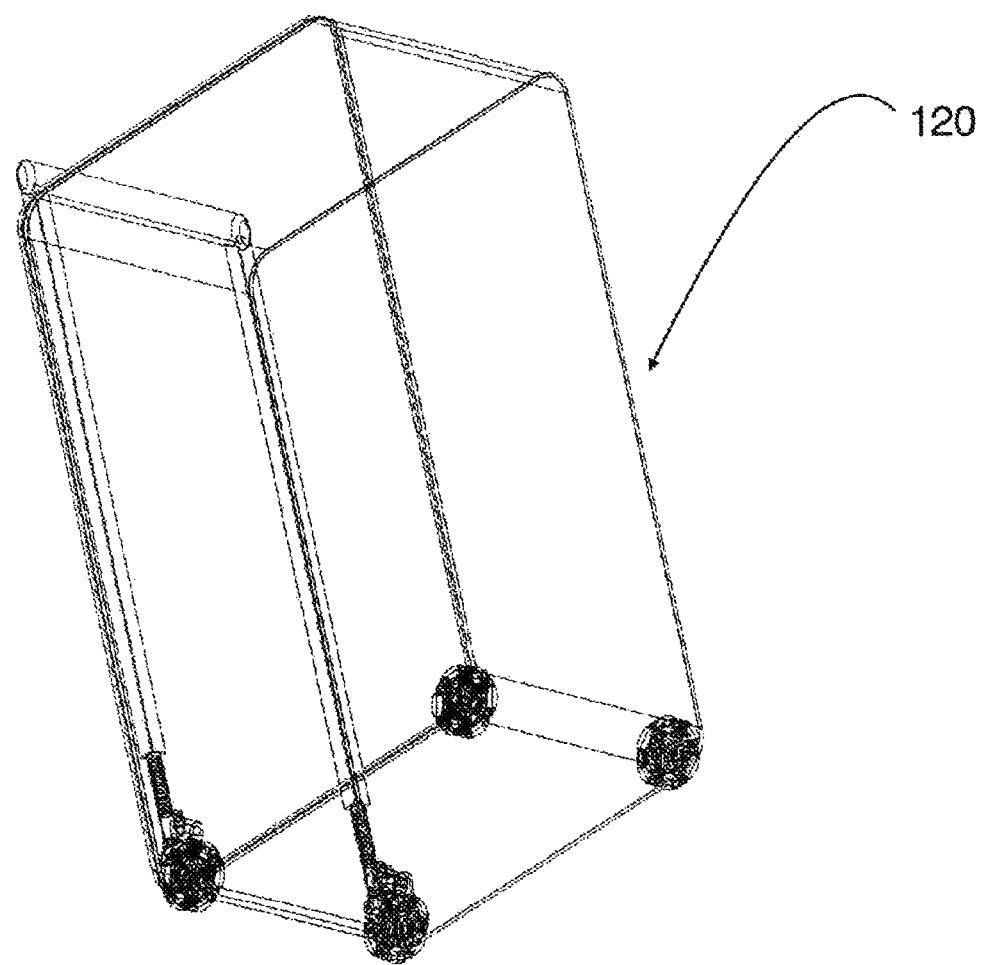
Figure 5C:
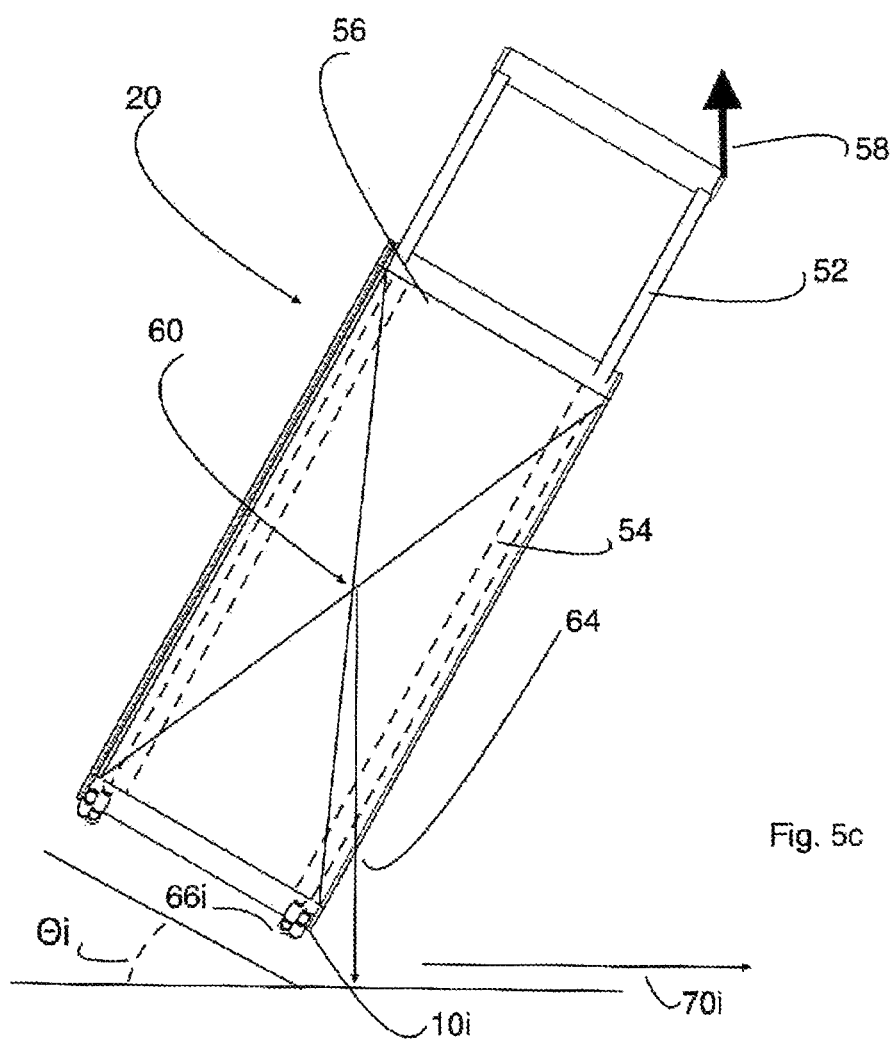
Figure 6:
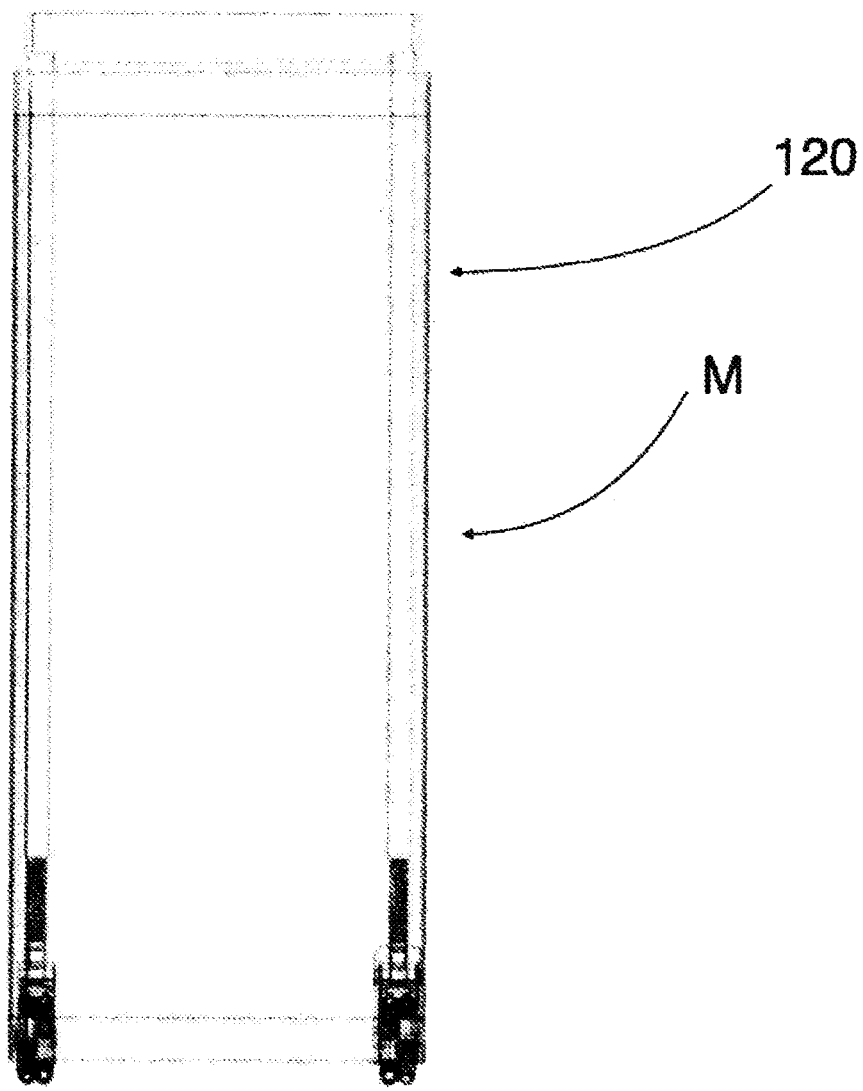
FIG. 6a is a side view of the case shown in FIG. 5a partially cut away to shown a handle and brake mechanism.

In FIG. 3, there is shown a base 40i of a second embodiment, noting that the base 40i is much wider than the base 40. However, like features of the second and third embodiments will be referred to using like reference numerals of the first embodiment.

The base 40i includes a wheel base 42 comprising a rear set of wheels 44i and a front set of wheels 44ii. Each wheel set 44i, 44ii may include a rigid structure, such as a beam or rod 46i, 46ii. The rigid structure 46i, 46ii advantageously provides a substantially rigid and non-axially compressible structure at the narrow ends of the base 40i. The rigid structures 46i, 46ii may form part of a frame of the wheel base 42 or may be simply formed in the interior of the container 30 as part of the generally stiffly constructed base 40i. In the clam shell arrangement, one set of wheels may be mounted to a base panel of the lid 36 and another set of wheels mounted to the base shell part, whereby, when the container 30 is closed, the two sets of wheels combine to form a unitary wheel base. Case materials used for clam shell arrangements preferably include semi-rigid material, such as semi-rigid plastic that are moulded or spun blown, or metal or metal composite structures 50 provide the requisite stiffness of the structure 46i bridging between the wheels 10,10i and wheel sets.

The zip fastener 39 may be seen joining the lid 36 to the upper edges of the base 40 and the adjacent wall panels 32, 38 and 50. Particularly in hard shell cases, the zip fastener 39 may releasably join a split or clam shell pair of panels where there is separation down a central region of the lid 36.

The narrow rear wall 50 includes a pair of widely spaced telescopic handle rods 51 telescopically received in a pair of corresponding recesses 54 that are in the form of tubes or channels that are located internally in the container 30 and closely aligned to the respective peripheral edges of the rear wall 50, leaving a wide shallow valley 56 in the cavity 22. By providing the handle 52 on a narrow long side of the case 20, the large lower panel 34 presents a flat panel unencumbered by ridges. It is noted that, in the prior art, such ridges defining tubes or channels 54 are normally housed on a prior art suitcase's large wide base panel (equivalent to panel 34). This means that an efficient packer (traveller) will likely fill up the interstitial areas in prior art cases between the ridges on the lower wide wall with small, predominantly soft, packing items, such as underwear and socks, making them less accessible to the frequent traveller. In contrast in this embodiment of the invention, relocating the recesses 54 and handle 52 to the narrow side wall 50 frees up space in the cavity adjacent the lower broad panel 36, so that it is substantially internally flat to allow more efficient packing of larger and bulkier items, such as coats, shirts, dresses, trousers, etc., that benefit from being laid flat. This also avoids the inconvenience where packed articles that are normally frequently required to be retrieved from the case 20, such as underwear and socks, are packed at the bottom of a prior art case. Instead, in the case 20 made according to the embodiment, these frequently retrieved items can be packed at the top of the cavity 22, rather than submerged below less high turnover items, such as trousers, dresses, coats, etc.

In FIG. 3, there is shown a case 20i with a wide wheel base 42 that includes a rear set 44i of large wheels 10 at the rear of the base 40 and a front set 44ii of smaller wheels 10i at an opposed second edge 25ii at the front. Fixed main axes 62i of each of the first and second smaller wheels 10i are substantially parallel to a straight line 27ii extending between the first and second ends of the second edge 25ii. The wide wheel base 42 supports the load of the case 20i. The load is transferred through the rear 50i of the case 20i. Each wheel 10, 10i is respectively housed within a semi-toroidal recesses 24, 24i, 24ii. These are found in the corners of the base 40, 40*i*. They are also within the general footprint of the case 20*i*, when all four wheels 10, 10*i* are in ground contact.

The wide wheel base 42 shown in FIG. 3 fully supports the case's 20*i* load with all four wheels 10,10*i* in ground contact. There is an option for the operator to tilt the case 20*i* back onto its rear wheel set 44*i*. This provides flexibility for varying terrains and speed. The load can be balanced over the rear two wheels 10 of the rear wheel set 44*i*, thereby minimising the load borne by the user. The case 20*i* can be readily pushed or pulled in both modes (Tilt T and Stand S) whilst maintaining directional control (due to the tendency of the wheels 10,101 to track) and load stability relative to speed and terrain.

The wheel base 42 provides full 360 degree rotatability about a substantially vertical axis, and manoeuverability corresponding to three degrees of freedom. The case 20*i* responds directly to a user's application of transverse or lateral force to overcome inertia and redirect the path of the case 20*i*, whereas prior art casters do not. The case 20*i* tracks consistently, depending on input forces applied by the user about the primary wheel axis 62. Unlike caster wheels, there is no offset associated with the wheels 10,10*i* about which to rotate, so that downward loads are applied directly through the wheel 10 mounting points through to the static main axle 62. The wheels sets 44*i*, 44*ii* provide the 360-degree manoeuverability of a swivel caster, but with a directional tracking capability similar to that of a fixed wheel. Placing the handle 52 on the narrow rear wall 50*i* also allows the operator to push the case 20*i* and turn it with omni wheels 10,10*i* with ease. The case 20,20*i* can be readily pushed or pulled in both directions 70,70*i* (and corresponding reverse directions) whilst retaining directional control and enjoying relative load stability in terms of speed and terrain compared to a prior art case bearing caster wheels and with less risk of tipping forward if an obstruction is encountered (due to centre of load) while providing the possibility that one may simply step or ride the case 20 over an obstruction.

As seen in FIGS. 4*a*-4*b*, the case 20 may be tilted by a user holding the handle 52, so that the case 20 can be transported whilst only supported by two large wheels 10. By tilting the case 20 about 35-45 degrees (theta θ) as shown in FIG. 4*a*, the centre of gravity (COG) 60 of the container 30 may be moved over the general location of a main axis 62, so that the main load 64 of the case 20 is generally centred over the main axis 62 and the load on the handle 52 is minimal. In contrast, a prior art caster wheel would unstably swivel laterally and then rearwardly to a position 66 behind its initial position before being dragged, so that the load would be well forward of the caster wheels 66,66*i* in the prior art example and therefore a greater and undesirable load would be imposed on the user through the handle 52. Moreover, the load of the prior art caster wheel arrangement would be most unstable as the case is dragged in a new direction as the COG shifts over the caster vertical axis. Such instability is not found in the present inventive case 20,20*i*.

Where it is required to transfer the case 20 from a lower surface to a higher plateau, e.g. via a step, such as when negotiating curbs and other raised obstacles, the case 20,20*i* is well adapted. The user may place a foot at the lower portion 55 of the back 50 of the case 20 to brace it and provide a brake therefor, and may pull back on the handle 52 towards the user. The front 32 of the case can then be raised and the front wheels 10*i* rolled or pushed forward to engage with the upper level of a curb or single step. The load may therefore be levered forward up onto the upper level with much less effort than having to pull the whole load up, also avoiding any need for the operator to reverse and approach the obstacle walking backwards.

In FIG. 4*b*, the case 20 may be supported on one large wheel 10 (obscured) and one small wheel 10*i*. This orientation provides a useful comparison to a case bearing swivel casters. It shows the advantage of stability in the luggage cases 20,20*i*, which are more stable against overturning both on a flat surface and on inclines than cases bearing caster wheels.

The ground-engaging large and small wheels 10, 10*i* still provide desirable, low-resistance rollability in a direction having a vector component substantially at right angles to the direction of travel 70 shown in FIG. 4*a*. Referring to the case 20 shown in FIG. 4*b*, if the case 20 is pushed in a direction opposite to direction 70*i* by applying a force through the handle 52 that is substantially parallel to the plane 56 in which the handle 52 lies, the case 20 can be pushed with the case 20 oriented with one of each of the wheels 10,10*i* of the wheel sets 441,44*ii* in ground contact on the case's broad side 36, so that the wheel base 40 formed by each of the wheels 10,10*i* is wide (compared to the narrow wheel base 44 shown in FIG. 2*a*) and the case 20 has even extra stability. A wheel 10,10*i* may have two or more races A,B with a triple race suitable for cases 20 with a heavier load capacity, compared to cases 20 with wheels 10,10*i* having, for example, only two races A,B per wheel 10,10*i*. Alternatively, the case 20 may be pulled in a direction 70*i* substantially parallel to the plane 56 in which the handle 52 lies.

Travel of the case 20 in the direction 70*i* relies on the rotation of the ground engaging rollers 14*a*, 14*b* of wheels 10,10*i*. This involves greater friction and resistance rolling in this direction 70*i*, due to the sole reliance on the rollers 14*a*, 14*b*, compared to the much lower friction and resistance associated with rotation of the wheels 10, 10*i* about the main axis 62, 62*i*. Accordingly, good tracking performance is achieved in the primary direction 70 of travel of the case 20, that is, in a direction substantially normal to the main axis 62,62*i*. This tendency to track when the wheels 10,10*i* rotate about the main axis 62,62*i* also causes the case 20 to be less reactive and less prone to rolling sideways when traversing an incline, such as a sloped footpath or walkway. It also allows the case 20 to be parked sideways on inclines without the propensity of a swivel caster to roll downhill. Positioning the handle 52 along the rear wall 50 means that the plane 56 (which is the plane in which the handle's 52 rods and cross bar handle lie) is positioned on a narrow side 50 of the case 20, rather than centrally on a broad side (such as side panel 36), as is customary in the prior art. The spacing of the wheels sets 441, 44*ii* is maximised by setting the wheels 10, 10*i* as close as possible to each end of a structure 46*i*. The structure 46*i* may be a beam, rod, shaft or semi-rigid wall located in the lower portion 55 of the narrow rear wall 50.

The stability of the wide wheelbase 42 is similar to a corresponding fixed wheel base pair and the static relationship of the case 20 with the centre of gravity (COG) provides excellent load stability. When stationary, the case 20 can move when bumped and tilt further than a swivel caster arrangement without the same risk of overturning, the degree of permissible tilt being a function of the width of the wheel base and the COG.

The travel of the case 20 in this direction 70*i* is very stable and comfortable for the user pushing or hauling the case 20 by the handle 52. In contrast, an equivalent prior art swivel caster would unstably swivel or fishtail behind the front of the base of a prior art suitcase and assume a more rearward position 66i shown in FIG. 4b, so that, at the same angle ⊖i, the COG 60i of the container 30 would be well over the centre point of the ground engaging rollers 14a, 14b of wheels 10, 10i, thereby imposing a greater load on the user through the handle 52, so that the user must lift the handle more upwardly using upward force 58. However, a comparison with prior art swivel caster wheel bases indicates that such prior art arrangements add substantial cantilevered forces due to the extreme angle assumed by caster swivel fork arms.

The luggage case 20 using the wheel base 42 tracks across inclines almost as well as prior art fixed wheel base arrangements. The luggage case 20 can be parked parallel to a curb or downward ledge, or across a minor incline. In doing so, the smaller peripheral rollers 14 have greater rolling resistance and provide a useful braking effect, compared to rotation of the wheel 10 about the main axis 62. Therefore, on the incline, any downward movement of the case 20 traverse to the direction of travel in which the case 20 moves by rotation of the wheels 10 about the main axis 62, will involve rotation of the peripheral rollers 14. This minimises the risk of inadvertent rolling down an incline like a case bearing caster wheels and, in any case, provides a brake or rolling resistance to reduce any inadvertent lateral and downward movement.

Braking may be provided. This may be with respect to the rear wheels 10 and/or the front wheels 10i. In any case, as the omni-wheel 14 generally requires a small amount of inertia to initiate movement as a small amount of force is required to overcome the roll resistance inherent in the end edge 15 of the roller 14 in the main direction of travel (opposite to Direction 70 when pushing the case 20) and to overcome the minor resistance to rotation about the rollers' axes that is inherent in the rollers 14 themselves. The wheel 14 is therefore less reactive to minor longitudinal and lateral forces than a swivel caster and therefore more controllable by the user.

The braking may be effected in a number of ways. For example, in one embodiment shown in FIGS. 5a-6b, the brake 90 may include a pivotal cam or friction pad located adjacent one or both wheels 10 in a wheel recess 24. The brake mechanism 90 may be actuated by collapsing the telescopic handle 52 and causing the lower most end 53 of the rods 51, such that the lower-most telescoped section 53 forming part of the handle 52 urges the brake mechanism 90 into engagement with the wheel 10 against a spring bias operating adjacent the pivot of the brake 90. On retraction or expansion of the handle 52 and corresponding to the lowering or lifting, respectively, of the lower section 53, the brake mechanism 90 is applied or released, so that wheel 10 is unbraked when the handle 52 is expanded, and the brake 90 is applied to the wheel 10 when the handle 52 is retracted into the recess or channel 54. The brake 90 may be aligned co-parallel with the lower section 53 and may comprise a stop on the end of the lower section 53. The peripheral profile of the luggage case 20, with particular regard to the generally straight edges, when viewed in plan, of the side panels 34,36 and adjacent sides of the wheel base 42, also improve the utility to facilitate parking against a structure, such as a landscape feature or other fixed object, by keeping the wheel 10,10i profiles substantially within the recesses 24,24i and the wheels 10,10i substantially within the footprint (for example as defined by the wheel base 40,40i) of the case 20,20i.

In use, particularly with reference to FIG. 4a, the case 20 with a wide wheel base 44i in which the large wheels 10 are housed in widely spaced recesses 24 at the extreme ends of the first edge 44i and rotatable about a main axis 62, the wheel base 42 provides extremely stable travel on either multiple directional rear wheel set 24i, or the whole wheel base 42,42i (whereby all four wheels 10,10i are in ground contact), in the direction 70 (or the opposed direction to 70 when the case 20 is advantageously pushed). This is whilst taking advantage of the case's 20 narrow-most profile, so that the case may be conveniently pushed or towed by a user through narrow spaces, such as aeroplane passenger aisles, with the added convenience of having multi-directional wheels 10,10i that enable lateral movement in a vector traverse to the direction 70 to avoid and negotiate obstacles in tight spaces. Also, directional tracking, combined with narrow primary dimensions, makes collision with aisle seats, etc. less problematic. Collisions and lack of manoeuvrability in tight spaces is a problem for prior art luggage cases, with most prior art users ending up having to pick up and carry their carry-ons down the aircraft aisle. Thus, prior art caster wheels only permit limited agility whilst utilising an unstable and variable wheel base.

To facilitate negotiation of obstacles such as stairs and curbs, and to provide a buffer or bumper 57 protection for the wheels 10,10i, the rear wall 50 corner edges common to side panels 34,36 extending from the wheel recesses 24 upwardly and substantially parallel to the channels 54. The bumpers 57 are adapted to provide a glide rail or guide 57 to present a riding surface by which the bag 20 may slidingly rest against a step or curb as it rides over the step, curb or the like, and provides a guide for the negotiated surface to ride from the bumper 57 on to the wheels 10. The glide rail 57 may be linear or may be convex in its outer curved surface. The bumper may have longitudinal ribs on their respective outer surfaces that form the rails.

Similarly, the handle 52 arms are housed in widely spaced channels 54 at the extreme sides of the rear narrow wall 50, spaced laterally s widely as possible for greater stability.

Unlike the fixed wheel prior art, the case 20 can be pushed in virtually any direction or orientation. With the handle 52 at the back 50, in narrow isles the case 20 can be manipulated to step over obstructions or be titled back on the rear wheels 10. The case 20 displays improved length ways tracking normal to the main axis 62 in tight and narrow spaces, such as aisles. In check-in, immigration or customs quenes, the case 20 may be pushed in any direction, but the directional control due to good tracking properties makes such manoeuvring easier and very direct. Applicant notes that the independent action of the omni-wheels 10 enables different cases 20 to be bound and wheeled or rolled together without the problem of swivel resistance encountered in prior art swivel caster arrangements.

Figure 2B:
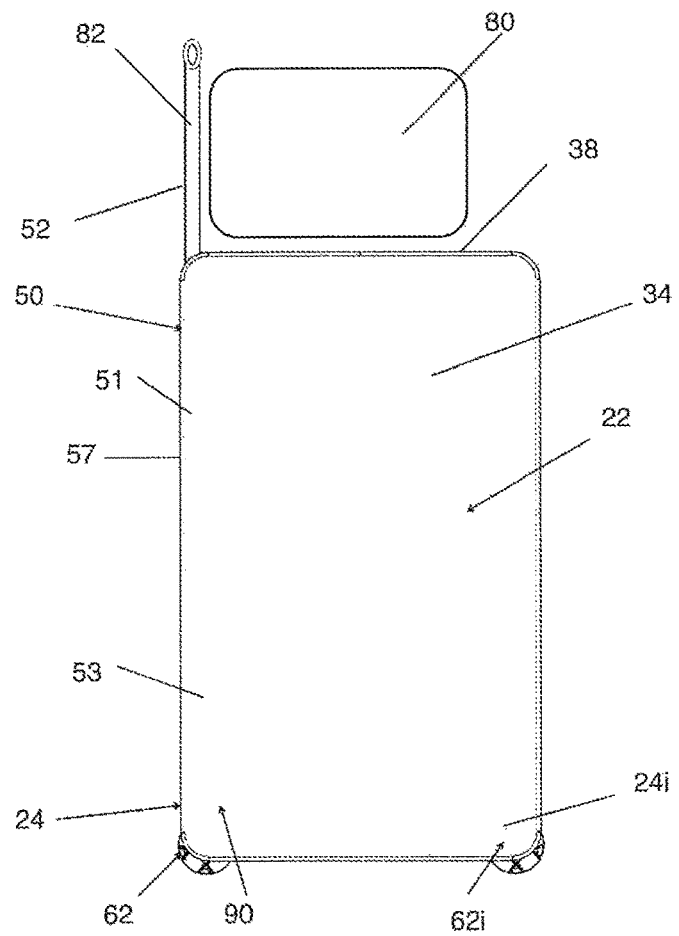

As per the prior art two fixed wheel arrangement, minimal space is required in the wheel arches 24,24' to house the wheels in a substantially two dimensional space in the sense that they rotate about the fixed main axle 62,62i in a constant plane relative to the case 20,20i. In contrast, casters operate by rotating about a vertical axis through a toroidal space requiring more space to accommodate the shifting horizontal axis. In the present embodiments, the larger wheels 10 can be housed in the small space 24 thereby providing easier rollability, and terrain and obstacle negotiation, compared to a caster wheel base arrangement. The wheels 10,10i can be housed in a small space whereby the wheels 10,10i do not protrude into the surrounding space adjacent the case 20,20l. As the omni-wheels 10 of the invention can be accommodated within a minimal space 24,24i, the overall internal volume 22 of the container 30 can be optimised (compared to caster wheel arrangements where the wheel housing must be designed to encroach on either the interior space 22 or substantial space outside the case's 20,20*i* footprint). This is advantageous for travellers who rely solely on carry-on luggage. With reference to FIG. 2*b*, it can be seen that case 20 can be deployed in a self-supporting mode in which all four wheels 10, 10*i* are in ground-engaging contact, so that a user is not required to support the load 64 by the handle at all, but to use it for steering the case 20, etc. This is useful for situations, such as airline queues where a user may be intermittently stationary and required to stand by her luggage for extended periods of time. It is also useful for supporting extra luggage bags 80 that may be attached by a strap 82 above the top wall 38 to the handle 52. Thus, the wheel base 42 may support additional loads 80 without discomfort or significant additional effort on the part of a user.

In light of the above, the case 20,20*i* provides the following significant advantages over the prior art:

(a). The multiple directional wheels 10, 10*i* provide the user with greater directional or tracking control as the wheels 10, 10*i* tend to track in a direction normal to the main axes 62, 62*i* whilst still permitting lateral rolling motion, enabling turning and rotation, by means of the peripheral rollers 14*a*, 14*b*.

(b). The wheels 10, 10*i* are housed within the recesses 24, 24*i* which, in turn, fall within the footprint of the case 20, for example, when viewed through the top wall 38 downwardly in the direction D shown in FIG. 2*b*. The smaller wheels 10*i* are contained wholly within the footprint and the larger wheels 10 are contained substantially within the footprint, as shown in FIG. 3. Larger wheels 10 of between 70-80 mm are advantageous for negotiating raised level obstacles, such as curbs and stairs, as well as uneven terrain. The fixed wheel mounting of the wheels 10,10*i* requires a small recess housing 24,24*i*, so that the container 30 provides greater bag space 22 relative to the footprint, compared to an equivalent case fitted with prior art swivel caster wheels. In contrast, the swivel casters of the prior art provide a more unpredictable and less stable wheel base, making travel in direction 70 more difficult to manoeuvre because, in the prior art bag, the swivel offset tends to destabilise the travel of the bag. The wheel base 42 of the preferred embodiments 20,20i is, for an equivalent footprint, static, stable and wider by virtue of the wheels 10, 10*i* being mounted on static or fixed main axes 62, 62*i* and set as widely as possible by being located at close to the ends of the structures 46*i*, 46*ii* as possible.

(c). Providing a widely spaced handle 52 along the narrow side of the case 20,20*i* improves the efficiency of space within the cavity 22 whilst optimising the stability and control of the case 20,20*i* by the user through the handle 52. Placing the handle on a narrow side 50 of the case 20,20*i* frees up space in the cavity 22 near the broad side walls 34,36 to improve the user's packing options. The multi-directional wheel 10 is larger than typical caster wheels on equivalent luggage applications. Moreover, the smaller wheel 10*i* may be larger in diameter than standard wheel sizes currently used on prior art cases. This provides stability and manoeuvrability for the case 20,20*i* by enabling the case to be negotiated over rough terrain (by virtue of the larger wheels 10,10*i*) and the static main axle 62. In contrast, the prior art swivel caster typically used on luggage has a smaller diameter and is easily destabilised, particularly on uneven terrain and is harder to push on carpet or other surfaces where the wheels may make a depression in the surface material.

By placing the handle 52 on or in the narrow back wall 50 whereby to leave the broad walls unencumbered by wheel housings 24*i*, 24*ii*, the container 30 provides more flexibility in packing and optimum use of available space, compared to prior art cases where the telescopic handle is normally located in a broad side wall 34,36. By placing the main handle rails 54 in the corners this further provides greater and more efficient usable space between the rails 54 on the back face 50 as well as some structural advantages in that the rails form part of, or can support the container 30 frame, or moulded or formed structure to give the back 50 improved rigidity and strength.

(d). The wheel base 42 enables a user to "step" the case 20 up a curb whilst holding the handle 52 and pushing the case 20,20*i* in a direction opposite to the direction 70. This is shown in FIG. 4*a* where the case 20 may be tilted backwards by the handle 52, so that the front wheels 10*i* clear the obstacle. The case 20,20*i* then may be tilted downwardly to engage the upper flat surface of the obstacle (such as a curb). The handle can be tilted forward in direction F to urge the large wheels 10 to ride over the obstacle and to come to rest on the upper surface of the obstacle in the self-supporting mode S shown in FIG. 2*b*. Such a manoeuvre would be problematic using a prior art bag supported by swivel casters. However, because the present embodiments enable the operator to comfortably push the case 20,20*i*, such a curb-climbing manoeuvre is achievable more ergonomically than would be so if the case 20,20*i* were to be dragged up and over the obstacle.

(e). In the tilt mode T shown in FIG. 4*a*, the centre of the load 60 is stable as it is effectively close to directly above the main axes 62, so that the load 60 is substantially balanced over the large rear wheels 10. Swivel casters prior art devices, when used in the tilt mode T, are prone to breakage or failure and such manoeuvres over obstacles by pushing the case 20,20*i* forward are difficult, if not impossible.

FIGS. 5*a*-7*c* show a third embodiment in the form of a case 120 having a wheel base 140 comprising a pair of multi-directional wheels 110, each wheel located in a lower corner of a container 130 of the case at the base 155 of a narrow rear wall 150. In each of the corners of the long edges of the wall 150 there is a recess 154 running the full length of the sides. Each recess 154 houses a telescopic shaft 151 that extends substantially from the wheel 110 up to a handle bar 152. There are potentially three positions that the operator may choose for the case 120. These positions are: (1) The handle 150 is fully down or retracted and the brakes 190 are activated to locked the wheels 110. (2). The handle 150 is extended and brake 190 is released from a locked down position, but the handle 150 is not fully extended. This allows the luggage case 120 to be pushed around simply by the operator's foot, leg or hands, with the hindrance of the brake 190 being applied to the wheels 110. (3). The handle 150 is fully extended thereby allowing the luggage case 120 to be pushed or pulled via handle 150 or as per item (2).

Figure 7A:
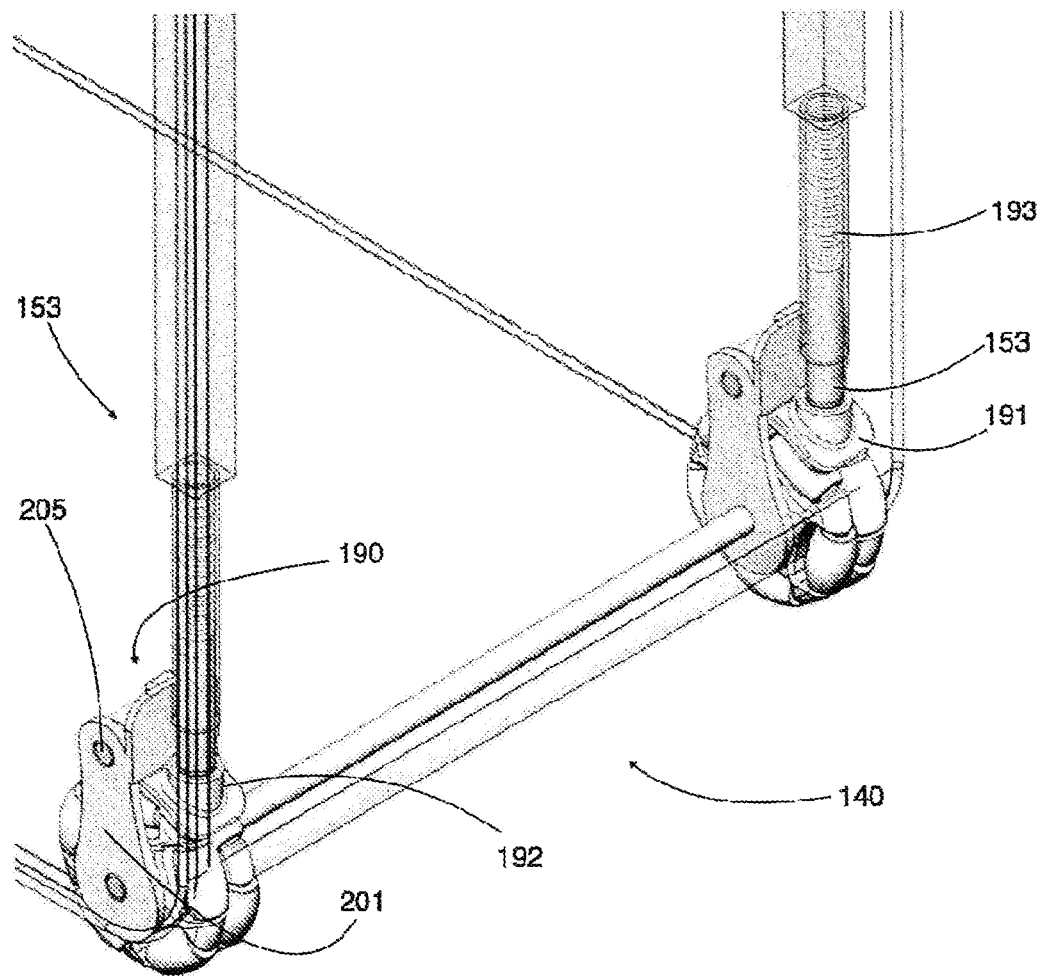
FIG. 7a is a perspective rear view of the case shown in FIG. 5a partially cut away to reveal brake and wheel mechanisms.
Figure 7B:
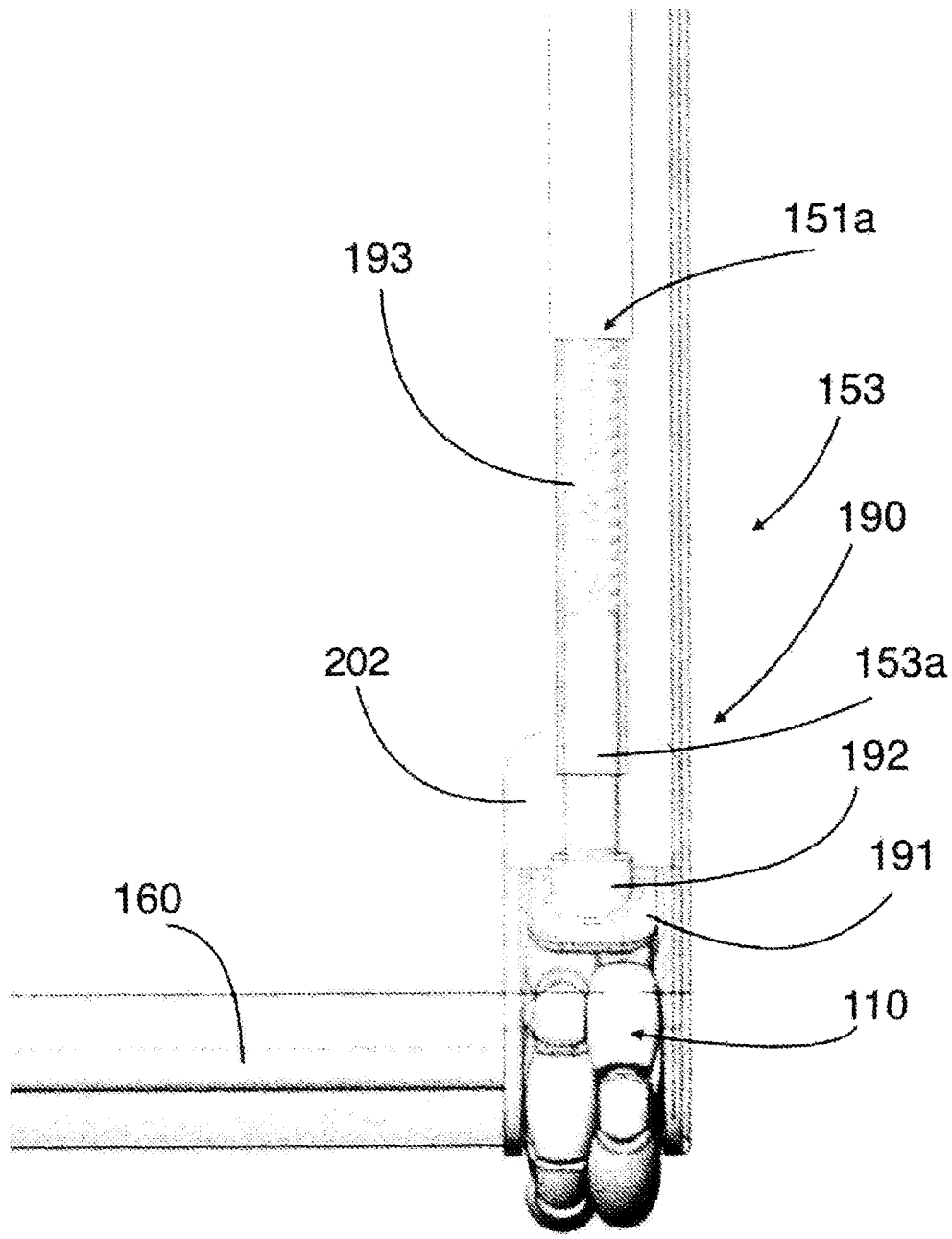
Figure 7C:
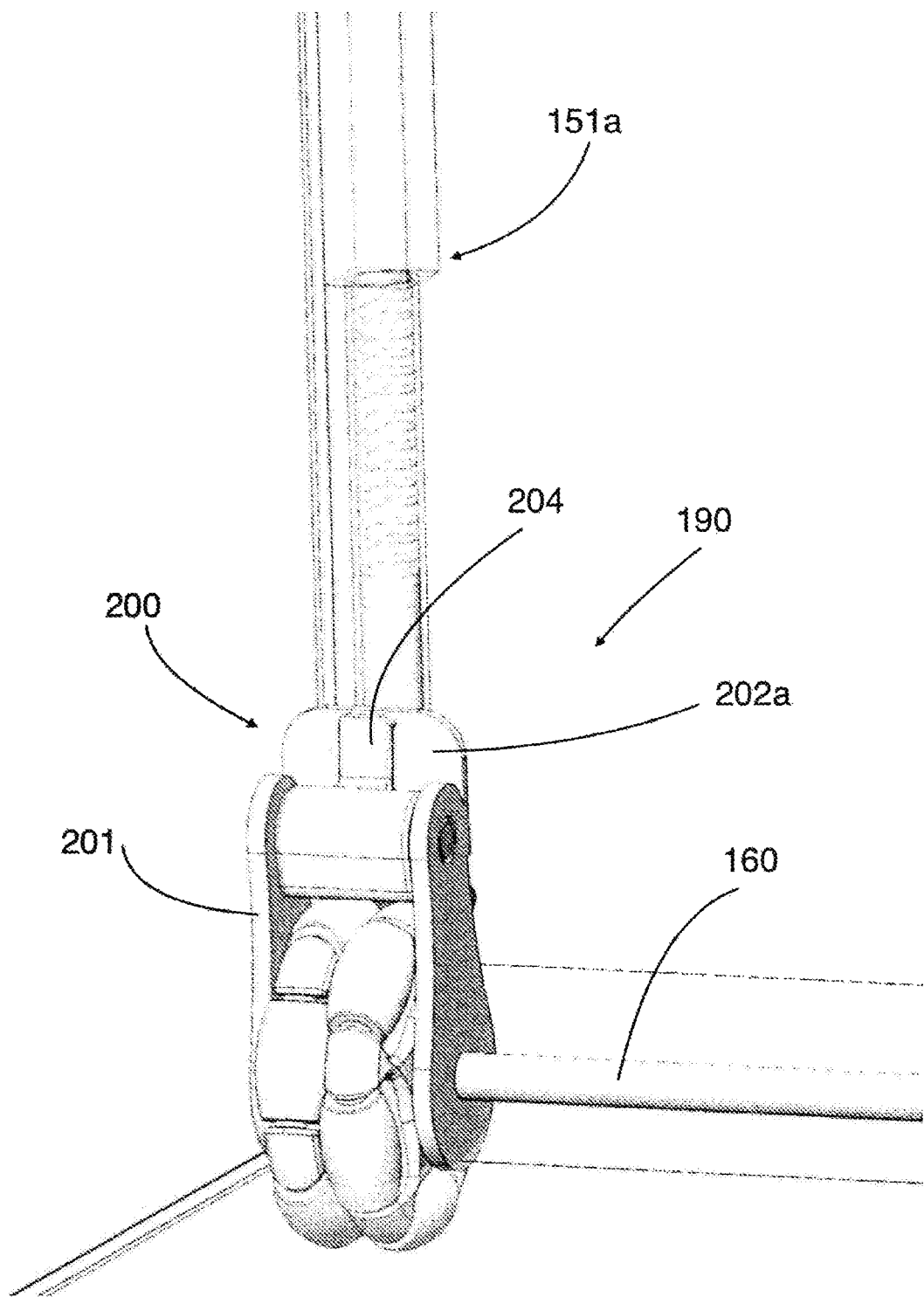
FIG. 7c is a front view of the case partially cut away to reveal the brake and wheel mechanism shown in FIG. 7b.

As shown in FIGS. 7*a*-*c*, the lower portion 153 of the shaft 151 terminates at a brake mechanism 190. Downward force urged by the shaft 151 when the handle 152 is in the collapsed position and applied by a terminal end of the lower portion 153 is borne by a brake pad 191 having an upper saddle 192 to receive a terminal end foot 153*a*. The terminal end 153*a* is forced down on the brake pad 191 with dampened force applied by bias means 193 in the form of an axially compressible spring 193. When the handle 152 and the shaft are telescopically extended, the pressure and force applied by the terminal end 151a of the intermediate section of the shaft 151 to the lower foot 153a (and hence the brake pad 191) through the bias means 193 is minimised. In this position, negligible or no friction is applied by the brake pad 191 to the wheel 110 and the wheel 110 is therefore free to rotate about a main axle 160 or axis 161.

The wheel 110 and brake mechanism 190 are mounted to a bracket 200 that comprises a pair of side panels or structures 201 spaced from and preferably parallel to each other, and bridged by an upper tongue member in the form of a plate 202 that provides a rear wall surface 202a that performs as a mount for an upwardly extending arm 204 of the brake 190. Where the brake pad 191 pivots about a horizontal axis 205 immediately above the wheel 110, the rotation of the tongue 204 is limited by the rear surface wall 202 to dampen the force applied to the rollers 114 of the wheel 110. Otherwise, the tongue 204 provides an anchor so that the flexible arm 204 is attached to the wall 202 and the brake pad 191 is adapted to flex elastically to apply brake pressure to the wheel 110 upon the shaft 151 bearing downwardly on the brake pad 191. When an operator raises the handle 152, the compression force on the bias means 192 is released and the force on the brake pad 191 is released to allow the wheel to rotate freely.

The case 120 therefore advantageously has an automatic brake mechanism 190 that operates to brake the wheels 110 when the case is in a static mode M, and to release the wheels for unhindered rotation in an active mode when the handle 152 is extended.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the top wall 38 upwards.

It will be appreciated by those skilled in the art that many modifications and variations may be made to the methods of the invention described herein without departing from the spirit and scope of the invention.

The invention claimed is:

1. A luggage case comprising a container with a storage space defined by a narrow rear wall, wide side walls including a first side wall and a second side wall, and a rectangular luggage base with at least a long side edge being a long base edge of one of the wide side walls and a short first edge being a short base edge of the narrow rear wall, the first edge having a first recess at a first end of the first edge and second recess at a second end of the first edge, wherein the narrow rear wall is narrow compared to the width of the wide side walls; wherein the first edge is a short first edge that is short compared to the long side edge; wherein the luggage case further comprises a wheelbase having a wheelset including at least a first omni-wheel mounted to in the first recess and a second omni-wheel mounted to in the second recess; wherein the first and second omni-wheels permit lateral rolling motion and each of the first and second omni-wheels comprise a main axle fixed relative to the luggage case, the fixed main axle being substantially parallel to a straight line extending between the first and second ends; wherein the fixed main axle, the first and second recesses, and a portion of each of the first and second omni-wheels, are within the boundaries of a volume which is defined by the intersection of a rectangular footprint of the luggage case and a side projection of one of the wide side walls: wherein the first and second recesses and the first and second ends are located at corners of the first edge and the wide side walls that are at extreme ends of the first edge to maximize storage space within the luggage case; wherein the first and second omni-wheels are housed in widely spaced recesses at the extreme ends of the first edge; telescopic handle arms being housed in widely spaced channels of the rear wall wherein the wheel set is a first set of wheels; and the luggage case further comprises: a second set of wheels including one or two additional wheels spaced laterally from the main axle, the first and second wheel sets being structurally connected, whereby mounts of each of the first and second sets of wheels are adapted to contact a ground or floor surface so that the luggage case is self-supporting and the first and second sets of wheels have a fixed orientation.

2. The luggage case according to claim 1, wherein the one or more wheels of the second set of wheels are smaller in diameter compared to the wheels of the first and second multidirectional omni-wheels of the first set of wheels.

3. The luggage case according to claim 1, wherein the one or more wheels of the second set of wheels include a pair of spaced wheels located at each end of a second opposed base edge of the luggage case, the additional wheels being coaxially aligned with respect to each other and their respective main axis being parallel to the main axle of the first set of wheels.

4. The luggage case according to claim 1, wherein the widely spaced channels are at extreme sides of the rear wall.

5. The luggage case according to claim 1, wherein at least one wheel of the luggage case is braked by a brake mechanism.

6. The luggage case according to claim 5, wherein the luggage case includes a handle and movement of the handle is adapted to actuate the brake mechanism.

7. The luggage case according to claim 6, wherein the handle is a telescopic handle adapted to be retractable into a recess in the luggage case.

8. The luggage case according to claim 1, wherein the first and second wheel sets are structurally connected by a panel forming part of the base of the luggage case.

9. A luggage case including: a container defining a storage space defined by boundaries between a rear wall having sides connected to side walls and a rectangular luggage base with at least a long side edge and a short first edge having a first mounting point at a first end of the first edge and second mounting point at a second end of the first edge; a wheelset including at least a first omni-wheel located at the first end and a second omni-wheel located at the second end, the first and second omni-wheels having a main axle fixed relative to the luggage case and housed in widely spaced recesses at the first and second ends; the fixed main axle of the first and second omni-wheels being substantially parallel to a straight line extending between the first and second ends, and within boundaries of the luggage case that define the volume of space occupied by the container when considered in side projection; a handle comprising telescopic handle arms being housed in widely spaced channels at the sides of the rear wall; the first and second omni-wheels being housed in wheel arches at the extreme ends of the short first edge, optimizing storage space within the luggage case; the portion of the first and second omni-wheels and the wheel arches in which they are housed being within: the boundaries of the side projection; and the footprint of the luggage case when the wheels of the wheelset are in ground contact and the luggage base is substantially parallel to the ground: wherein the rear wall is narrow compared to the width of the wide side walls; wherein the first edge is a short first edge that is short compared to the long side edge; and wherein the first side is between 40%-70% of the length of the second side.

10. The luggage case according to claim 9, wherein each of the handle arms is retractably housed in a handle recess formed in a back panel of the luggage case, wherein the first edge is a lower edge of the back panel and is shorter than a pair of long side edges extending along each of the lower edges of the luggage case, the wheel base being located between the long side edges.

11. The luggage case of claim 10, wherein the case further includes a second wheel set comprising a pair of coaxially aligned wheels each having a fixed main axis.

12. The luggage case of claim 11, wherein the wheels of the second wheel set are multiple directional omni-wheels.

13. Use of a luggage case including hauling the luggage case across a ground or floor surface by a handle, the luggage case having: a container including a storage space defined by boundaries between a rear wall having extreme sides connected to side walls and a luggage base with at least a first edge having a first mounting point being a first wheel recess housing a portion of a first omni wheel at a first extreme end of the first edge and second mounting point being a first wheel recess housing a portion of a first omni wheel at a first extreme end of the first edge and second mounting point being a second wheel recess housing a portion of a second omni wheel at a second extreme end of the first edge the first and second omni wheels having a fixed main axle relative to the luggage case, a handle comprising telescopic handle arms that are each housed in widely spaced channels at the extreme sides of the rear wall; wherein the portions of the first and second omni-wheels, their respective main axle and the recesses in which they are housed are within: the general footprint of the case when the first and second omni-wheels are in ground contact and the luggage base is substantially parallel to the ground; and boundaries of the luggage case that define the volume of space occupied by the container when considered in side projection; the fixed main axle of each of the first and second omni-wheels being substantially parallel to a straight line extending between the first and second ends, the first and second omni-wheels maintain load stability and directional control whilst permitting a lateral rolling motion, and the first side is between 40%-70% of the length of the second side.

14. A method of manufacturing a luggage case, comprising the steps of: forming a container that has a storage space defined by boundaries between a luggage base, wide side walls and a narrow rear wall having extreme sides connected to the side walls, and the luggage base including a first edge at a base of the narrow rear wall, the narrow rear wall being between 40%-70% of the width of the wide sidewalls mounting a pair of omni-wheels including a first and a second omni-wheel, in recesses at the extreme sides of the first edge, the first omni-wheel mounted in a first recess of the recesses at a first extreme end of the first edge and the second omni-wheel mounted in a second recess of the recesses at a second extreme end of the first edge; the recesses being first and second multidirectional wheels in wheel arches that are within the general footprint of the luggage case when the first and second omni-wheels are in ground contact and the luggage base is substantially parallel to the ground, the first and second omni-wheels having a main axle fixed relative to the luggage case, the main axle is being substantially parallel to an imaginary line extending between the first and second ends, whereby the main axle is within boundaries of the luggage case that define a volume of space occupied by the intersection of the container when considered in side projection and the footprint; and mounting a handle with telescopic handle arms that are housed in widely spaced channels at the extreme sides of the rear wall despite the location of the first and second recesses; and maintaining load stability and directional control whilst permitting a lateral rolling motion.

15. The wheelbase according to claim 2, wherein the one or more wheels of the second set of wheels include a pair of spaced wheels located at each end of a second base edge opposed to the first edge of the luggage case, the additional wheels being coaxially aligned with respect to each other and their respective main axis being parallel to the main axle of the first set of omni-wheels.

16. The luggage case according to claim 2, wherein the one or more wheels of the second set of wheels are multi-directional.

17. The luggage case according to claim 4, wherein the one or more wheels of the second set of wheels are multi-directional.

18. The luggage case according to claim 1, wherein at least one wheel of the wheelbase is braked by a brake mechanism.

19. The luggage case according to claim 2, wherein at least one wheel of the wheelbase is braked by a brake mechanism.

* * * * *

UNITED STATES PATENT AND TRADEMARK OFFICE
CERTIFICATE OF CORRECTION

| | | |
|---|---|---|
| PATENT NO. | : 12,167,784 B2 | Page 1 of 1 |
| APPLICATION NO. | : 16/467476 | |
| DATED | : December 17, 2024 | |
| INVENTOR(S) | : Peter Rodney McKinnon | |

It is certified that error appears in the above-identified patent and that said Letters Patent is hereby corrected as shown below:

In the Claims

In Column 16, Line 46, Claim 2, before "omni-wheels", delete "multidirectional";

In Column 17, Line 38, Claim 11, change "claim 10" to --claim 9--;

In Column 17, Line 42, Claim 12, before "omni-wheels", delete "multiple directional"; and In Column 18, Line 51, Claim 17, change "claim 4" to --claim 3--.

Signed and Sealed this
Eighteenth Day of March, 2025

Coke Morgan Stewart
*Acting Director of the United States Patent and Trademark Office*